April 29, 1941.     O. M. SWIMLEY     2,240,355
TRUCK
Filed Nov. 25, 1938
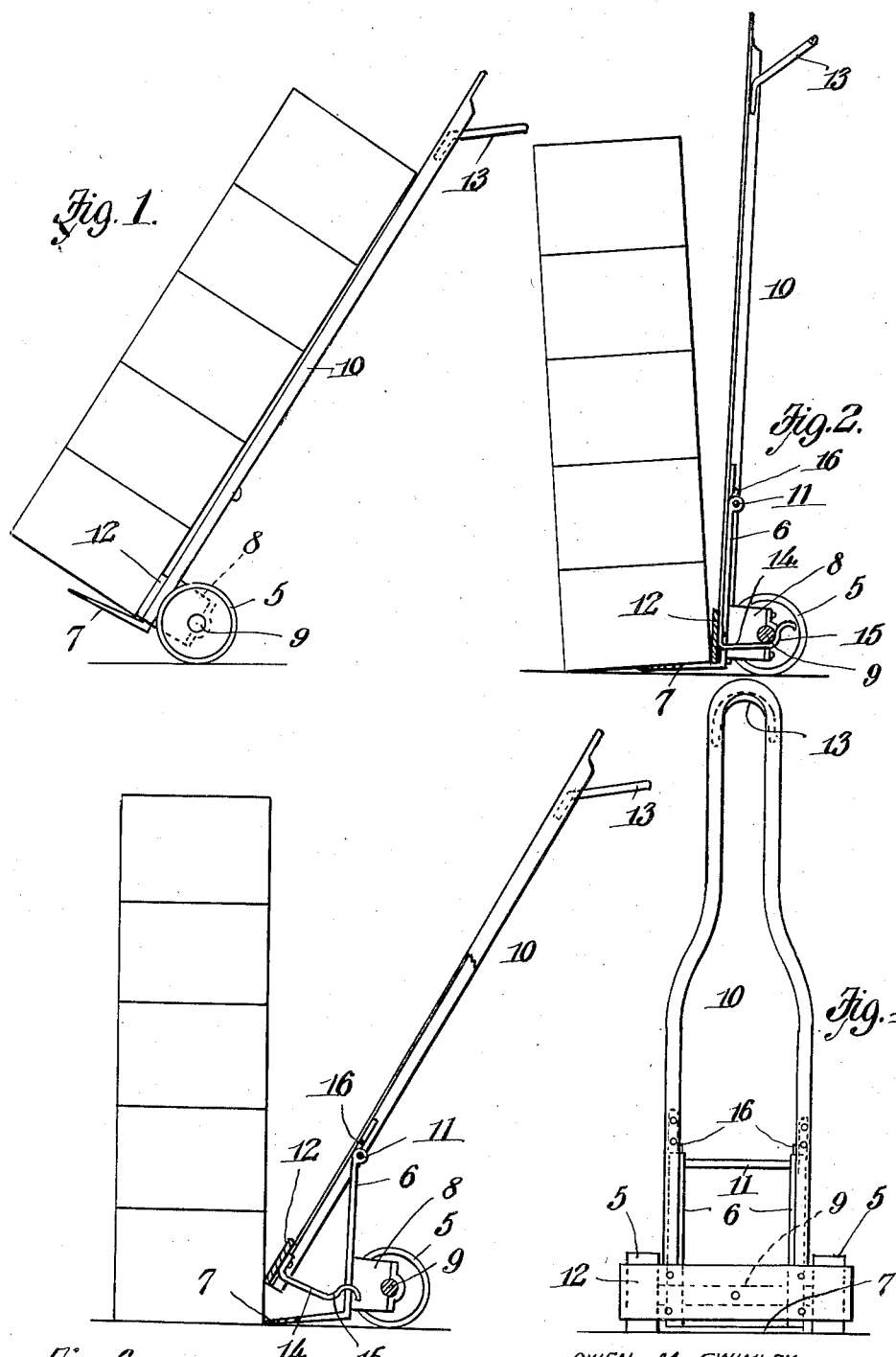

Patented Apr. 29, 1941

2,240,355

UNITED STATES PATENT OFFICE 2,240,355

TRUCK

Owen M. Swimley, Washington, D. C., assignor of one-half to Dwight B. Galt, Hyattsville, Md.

Application November 25, 1938, Serial No. 242,351

10 Claims. (Cl. 214—82)

This invention relates to trucks, and particularly to hand trucks used in warehousing and stevedoring operations.

The truck of my invention provides means adapted for rapid and easy handling of packages, boxes, sacks, barrels or other more or less heavy or bulky articles of freight, and is constructed in such manner as to facilitate accurate placing or positioning of the load in the interests of space economy. The invention aims further to provide a hand truck of simple construction and of light weight, which may be readily operated or manipulated in the carriage and depositing of loads, and which embodies means for removing the truck from beneath the load by easy and rapid operations.

In the accomplishment of these results, the truck is constructed in such manner that the load may be accurately positioned in the desired place, up-ended, and the truck readily removed from support of the load without rocking or further moving the load.

The several objects hereinbefore stated, as well as others which will appear as the description proceeds, are attained by the use of a truck constructed in accordance with the drawing and fully described in the specification. It will be understood, however, that variations in the structural elements here disclosed may be resorted to without departing from the spirit of the invention as defined by the claims.

In the drawing:

Figure 1 is a side elevation of a hand truck constructed in accordance with the invention and showing the same in the position it will assume in conveying a load of boxes;

Figure 2 is a vertical sectional view of the truck showing the same in up-ended position in depositing its load;

Figure 3 is a view similar to Figure 2 and illustrating the parts in the position they will assume in withdrawing the truck from beneath the load; and Figure 4 is a front elevation of the truck (with the load removed) in up-ended position.

The truck includes a chassis which may be provided with wheels or rollers 5 of any desired or approved construction in order that the vehicle may be easily propelled with its load. This chassis, or main supporting frame, includes a body 6, having the usual forwardly or substantially right angularly projecting toe or load supporting plate 7 at its lower end. For economy of construction and in the interest of light weight, the chassis may be constructed as a frame of comparatively small gauge steel bars disposed in spaced parallel relationship, and the angularly disposed toe or load sustaining plate may be formed integral therewith. The chassis has bolsters 8 secured to its under side, to which the axle 9 of the wheel structure is attached.

Associated with the chassis frame is a load bed 10, constituting a lever pivoted at a position between its ends, as at 11, to the chassis frame. This load bed is preferably formed of small gauge steel bars disposed in substantially parallel relation to one another and spaced apart a distance such as will enable them to straddle the bars 6 of the chassis frame. The load bed 10 is preferably straight throughout its length and its lower end normally overlies the chassis frame. A pusher plate 12 connects the lower ends of the load bed 10 and is disposed relatively close to the lower end of the said chassis frame. This plate preferably extends beyond the ends of the load bed and overlies the wheels or rollers 5 to provide guards for the latter.

The outer end of the lever or load bed 10 may be reduced in width as shown in Figure 4 to constitute a handle for convenient operation of the truck. The outer end may have secured thereto a rearwardly extending hand grip 13 to facilitate manipulation of the truck.

Means are provided for locking the lever or load bed against pivotal movement relative to the chassis frame, and this means may include any preferred type of latch or lock capable of easy and quick releasing operation when required. In the present instance, this lock takes the form of a spring latch member 14 secured at one end to the lower part of the load bed 10 and having a nose 15 at its free end for locking engagement behind the axle 9 when the load bed or lever 10 has swung into parallelism with the chassis frame 6. The free end of the latch member 14 may be downturned as shown, to afford means whereby the latch may be released by a slight downward pressure thereon by the foot of an operator. A stop 16 limits the outward swinging movement of the lower end of the load bed, and this stop may be so located as to limit the clearance of the plate 12, when the truck is up-ended, beyond the edge of the toe member 7.

In operation, the load bed and chassis frames will assume the positions shown in Figures 1, 2 and 4, the latch 14 maintaining them in this relationship. The load is loaded and moved in the usual manner; the load resting upon the lever or load bed 10 and also upon the toe 7. When it is desired to deposit the load, the truck is up-ended, as shown in Figure 2, and it will be understood that the load will be steadied by the hand in order to prevent it from toppling over. When in the position shown by Figure 2, the operator presses his foot against the rearwardly extending nose 15 of the spring, and at the same time pulls rearwardly upon the upper end of the load bed or lever 10. This causes the load bed or lever 10 to rock upon the pivot 11, whereupon the plate 12 pushes against the lower part of the load, forcing the chassis rearwardly upon its wheels and to withdraw the toe plate 7 from beneath the load. Upon the reversal of the direction of movement of the lever 10, the nose 15 promptly snaps behind the axle 9 and again locks the chassis and load bed in normal position.

The foregoing is a description of a simple embodiment of the invention, and it will be understood that variations in the construction of the chassis, load bed and the latch arrangement may be resorted to without departing from the spirit of the invention. It is also apparent that the inventive idea may be carried out in trucks designed for particular uses, without departing from the spirit of the invention.

Having thus described my invention, I claim:

1. In a truck, a chassis frame, a load rest on said frame, a unitary load engaging member hinged to said frame and comprising an operating handle for the truck, said member adapted to sustain a substantial part of the load when the truck is in tilted position a part of said frame overlying said chassis frame, and means releasably holding said member and frame in load sustaining alinement.

2. In a truck, a chassis frame adapted to support a load, a lever pivoted at a position between its ends upon said frame, one end of said lever being disposed with respect to said frame in such manner as to engage and partly support the load carried by said chassis, the other end of said lever projecting from the frame and serving as a manipulating handle for the truck, and means releasably holding said lever and frame together.

3. In a truck, a chassis frame, a load supporting plate on said chassis, a lever pivoted at a position between its ends to said frame and movable in the direction of travel of the truck, the inner end of said lever extending in load engaging position with respect to said frame and adjacent to said plate, the other end of said lever projecting from the frame and serving as a manipulating handle for the truck, and means releasably holding said lever and frame together.

4. In a truck, a chassis frame, a load supporting blade on said frame, a lever pivoted at a position between its ends upon said frame, said lever capable of pivoted movement in the direction of travel of the truck, the inner end of said lever normally disposed behind a load resting upon said blade, the outer end of said lever projecting from said frame and serving as a manipulating handle for said truck, and a latch holding said lever against pivotal movement.

5. A truck including a chassis frame, a lever frame pivoted inwardly from its ends to said chassis frame, one end of said lever frame arranged with respect to said chassis frame in such manner as to be disposed behind a load upon and supported by said chassis frame, the other end of said lever frame projecting beyond said chassis frame and serving as a manipulating handle for said truck, and means for locking said lever frame against pivotal movement with respect to said chassis frame.

6. A truck including a frame, a loading foot projecting from one end of said frame, a load sustaining lever overlying said truck frame and pivoted inwardly from its ends remote from said foot, said foot and lever contributing jointly to the support of a load when the truck is in normal position, one end of said lever disposed adjacent to said foot and the opposite end serving as a manipulating handle for said truck, and a latch to hold said lever in predetermined position with respect to said truck frame.

7. In a truck, a truck frame having wheels to support the same, a loading foot projecting from the lower end of said truck frame, a lever frame overlying said truck frame and pivoted inwardly from its ends to said truck frame remote from said foot, one end of said lever frame disposed adjacent to said foot and adapted to move outwardly across the latter, the other end of said lever frame serving as a manipulating handle for said truck, and a latch on said lever frame engageable with a part of said truck frame to hold the former substantially in parallelism with the latter.

8. In a truck, a truck frame including spaced parallel bars, a foot at one end of said frame, a load supporting frame including spaced bars hinged inwardly from their ends upon the opposite ends of said truck frame bars and normally disposed upon and in a plane parallel with said truck frame bars, said load supporting frame projecting beyond said truck frame and serving as a manipulating handle for said truck, a cross member connecting the bars of said truck frame, a latch member on said load supporting frame adapted to engage with said cross member, and a pusher plate connecting the load supporting frame bars at the inner ends thereof.

9. In a truck, a chassis frame, a load platform secured to said frame, a lever hinged inwardly from one end to said frame for swinging movement thereon and adapted throughout substantially its entire length to sustain part of the load when said truck is in tilted position, an end of said lever disposed adjacent to said platform and behind the load, and means for releasably holding said lever and chassis frame against relative movement.

10. In a truck, a chassis frame having means thereon to be engaged by a load, a lever pivoted inwardly from its ends to said chassis frame so as to be capable of swinging in the direction of travel of said truck, one end of said lever disposed behind a load resting upon said load engaging means, the other end of said lever projecting from said frame and serving as a manipulating handle for said truck, said lever contributing jointly with the load engaging means to sustain the load when the truck is in trundling position, and a latch to hold said lever against swinging movement.

OWEN M. SWIMLEY.